United States Patent [19]

Zimmer

[11] 4,281,812
[45] Aug. 4, 1981

[54] TRANSVERSE DRIVING BODIES, PARTICULARLY AIRPLANE WINGS

[75] Inventor: Herbert Zimmer, Friedrichshafen, Fed. Rep. of Germany

[73] Assignee: Dornier GmbH, Fed. Rep. of Germany

[21] Appl. No.: 77,713

[22] Filed: Sep. 21, 1979

[51] Int. Cl.³ .............................................. B64C 3/48
[52] U.S. Cl. ..................... 244/219; 74/102; 244/75 R; 74/96
[58] Field of Search ............... 244/213, 214, 215, 219, 244/75 R; 74/25, 86, 519, 525, 102–105, 107

[56] References Cited

U.S. PATENT DOCUMENTS

| 1,747,637 | 2/1930 | Larsen | 244/219 |
| 1,823,069 | 9/1931 | Stroop | 244/219 |
| 2,461,745 | 2/1949 | Lang | 244/215 |
| 3,179,357 | 4/1965 | Lyon | 244/219 |

FOREIGN PATENT DOCUMENTS

| 726206 | 8/1942 | Fed. Rep. of Germany | 244/219 |
| 721964 | 12/1931 | France | 244/219 |
| 158099 | 1/1921 | United Kingdom | 244/219 |
| 472567 | 9/1937 | United Kingdom | 244/219 |

Primary Examiner—Galen L. Barefoot
Attorney, Agent, or Firm—James E. Bryan

[57] ABSTRACT

This invention relates to an improvement in a transverse driving body, particularly an airplane wing, having a variable profile form and a displacing mechanism, the improvement comprising a plurality of link bends forming at least a part of the wing profile, each of the link bends including bearing segments and link band segments, the link bends adjoining each other in the manner of a link chain and including rebounds at intervals in their mutually facing front ends for the mutual hinged engagement thereof.

8 Claims, 8 Drawing Figures

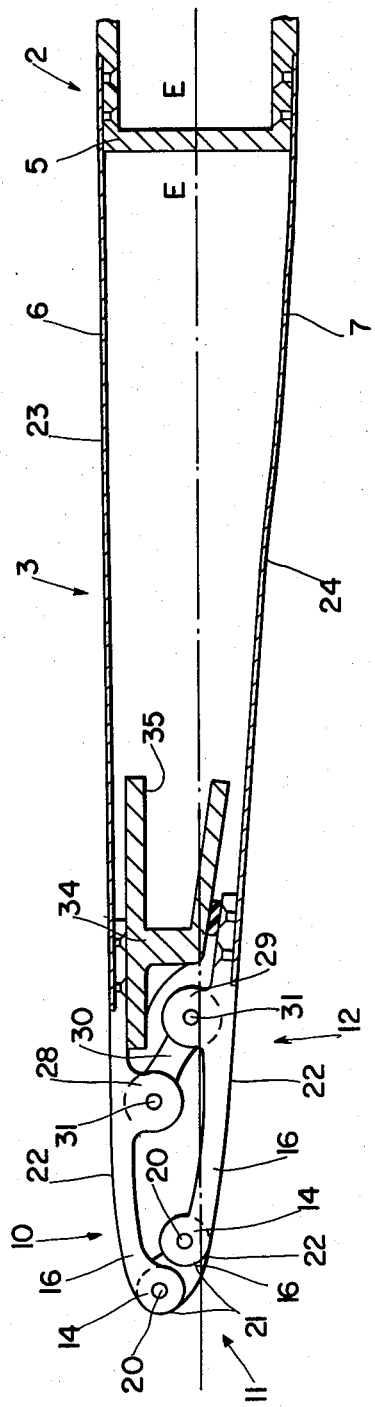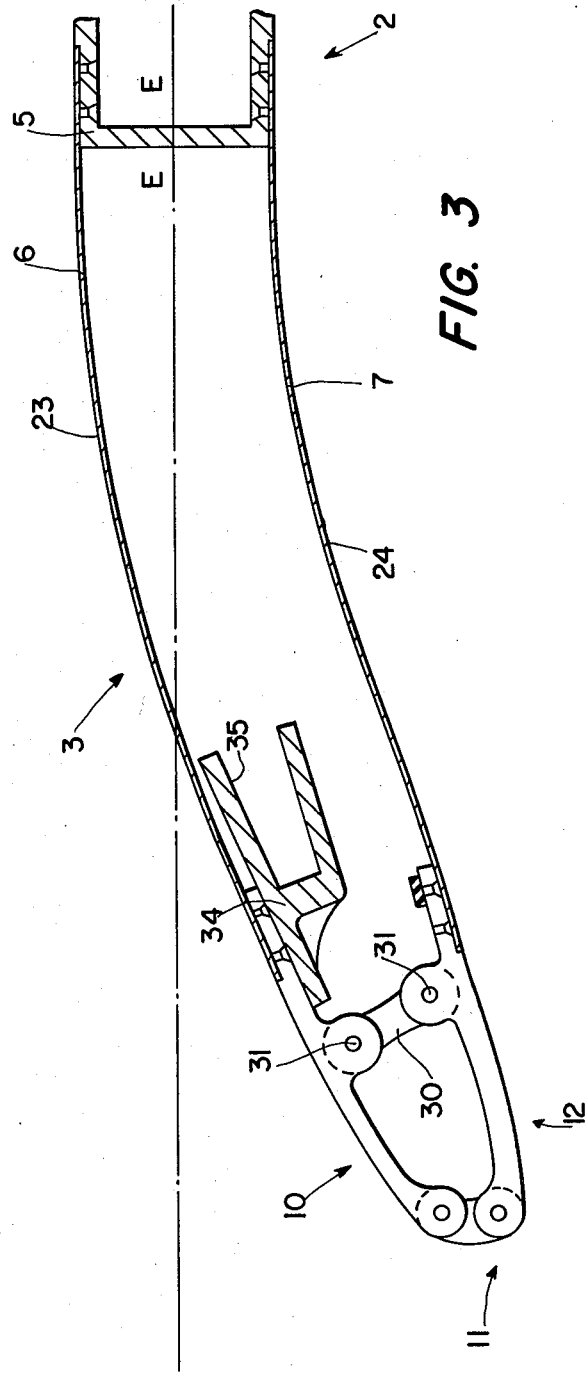

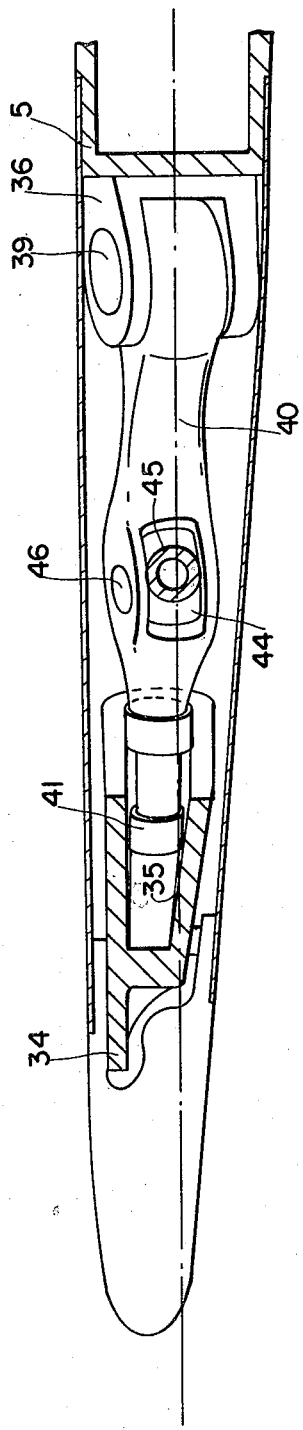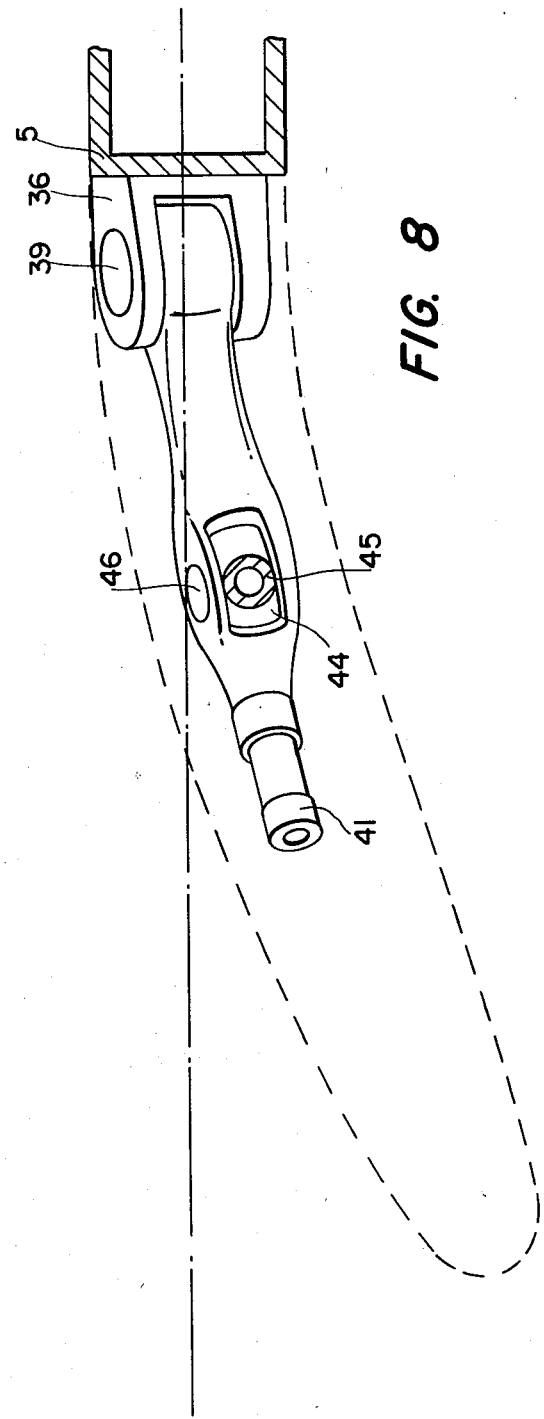

TRANSVERSE DRIVING BODIES, PARTICULARLY AIRPLANE WINGS

The present invention relates to transverse driving bodies, particularly airplane wings, having a variable profile form or shape, in connection with an adjusting device or mechanism.

With regard to the conception of transverse driving bodies, for example airplane wings, there exist basic problems independently of the type of aircraft for which the wing is provided. Problematic is the fact that wings are intended to operate maximally under very different operating conditions.

During take-off and climb the wing profile is intended to have a high lift coefficient, and a favorable glide ratio is intended to be achieved. These requirements are intended to be met also in maneuvering flight at transsonic mach numbers. For the realization thereof, a relatively strongly cambered and warped wing would be best suited. During cruising flight at subsonic speeds, and particularly at supersonic speeds, however, only small lift coefficients will result so that strong warping and camber are not required, and are not desirable in view of the generation of additional aerodynamic drag.

In order to arrive at a wing profile which meets all of the existing requirements, profiles are known whose camber and warping are adaptable to the different operating conditions.

For the realization thereof, wing constructions are known which have flexible coverings and movable profile parts at the leading and trailing edges in combination with control gears. The control gears therein are rather expensive kinematic systems which engage at the flexible coverings of the wings.

Further known for attaining the aforementioned goal are a multitude of different adjustable flap systems at the leading and trailing wing edges which form, among each other and with the wing, gaps being flown through in specific extended positions.

It is the object of the present invention to provide a wing construction which has a variable profile form and which construction is usable also for very thin wings suitable for supersonic speeds. It is moreover an object of the present invention to considerably reduce the aerodynamic drag that arises in the heretofore known constructions of wings having a variable profile shape or form while simultaneously improving the operational safety of the displacing or control members and of the parts of the wing.

The objects mentioned hereinbefore are obtained, in accordance with the present invention, by virtue of the fact that at least a part of the profiling of the wing is formed by a plurality of link band parts each composed of bearing segments and link band segments, which link band parts or components adjoin each other in the manner of a link chain, and which have at the mutually facing front end faces at intervals rebounds for the mutual hinged engagement by way of pivot axes.

With the aid of the inventive construction, it is achieved that the nose radius is adapted to the respectively favorable profile form or shape (profile thickness and profile camber). Furthermore, and simultaneously therewith, a closed profile form or shape is created without significant gaps, and therewith the aerodynamic drag is reduced to the lowest possible value. As a result of the construction of the link band parts or components forming the profile form in combination with the control gear, the inventive construction is usable also for very thin wings.

In a further embodiment of the present invention, it is proposed that the surfaces of the bearing and link band segments directly form parts of the flown-over surface of the wing profile. This construction makes it possible that additional sheetings forming the profile contour may be eliminated. The link band parts and the bearing and link band segments thereof are provided curved corresponding to the proposed profile form. The mutually engaging bearing segments of the link band parts establish in every link position a flow-favorable transition from one link band part to the other.

By virtue of the fact that the forward wing part is formed by the link band parts and that at least three link band parts are provided which include segments of the upper and lower profile sides, as well as the profile nose, it is possible to effect, by the relative displacement of the link band parts, simultaneously the change of the profile thickness and of the profile curvature, as well as the change of the nose radius.

In a still further embodiment of the present invention, it is moreover provided that the link band parts forming the end of the link chain at the upper and lower profile sides respectively adjoin a flexible covering of the wing clamped in at stationary wing parts, that, moreover, link band parts of the upper profile side and of the lower profile side are in operative engagement with each other with the aid of links by way of supporting elements (rocking levers), and that additionally, according to another feature of the present invention the link band parts form jointly with the supporting elements (rocking levers) a four-bar chain. Such a construction renders possible, by means of a connection of one or several members of the link chain to a servo-motor, simultaneously also a change of the profile form with respect to the profile curvature and the profile thickness. The radius and the thickness of the profile nose are thereby equally forcibly adjustable with the aid of the forward link band part.

Finally, in a still further embodiment final control elements or regulating units supported on stationary parts are disposed within the contour of the wing at the link band parts and at the flexible covering or sheeting parts in the sense of a change of the profile form at a right angle to the horizontal reference plane of the wing. In combination therewith it is furthermore another feature of the present invention that rigidly mounted at the upper and lower flexible covering or sheeting and at the link band parts connected thereto are adjusting coulisses with guide grooves in the horizontal reference plane of the wing, whereby adjusting levers—which execute movements in the vertical direction with respect to the reference plane by pivoting about inclined axes—engage in the grooves. This type of an actuating device requires the smallest possible space and renders possible an accommodation thereof also in very thin wings suitable for supersonic speeds.

For simplifying the manufacture it is desirable to construct the wing nose in a cylindrical fashion, as has been indicated in FIG. 1. Therewith it is possible to employ extruded molded pieces for the link band parts. Also the adjusting levers and toggle joints and also the pivot axes of the adjusting device may each consist of similar parts. The link band parts may be easily exchanged.

One embodiment according to the present invention is illustrated in the accompanying drawings, wherein FIG. 1 illustrates schematically and in a perspective view an airplane wing with an indication of the link band parts at the forward wing part in combination with adjusting members;

FIG. 2 illustrates the forward part of an airplane wing in a vertical cross-section taken in the direction of the profile depth;

FIG. 3 illustrates the forward wing part in the same general mode of representation as in FIG. 2, but with a profile form and profile curvature being changed as compared to FIG. 2;

FIG. 7 illustrates, in a vertical cross-section, taken in the direction of the profile depth of the wing, details of the control gear, and FIG. 8 illustrates, in the same representation as in FIG. 7, details of the control gear, but with a displacement changed as compared to FIG. 7, and in a corresponding profile form or shape and profile curvature.

Figure 1:
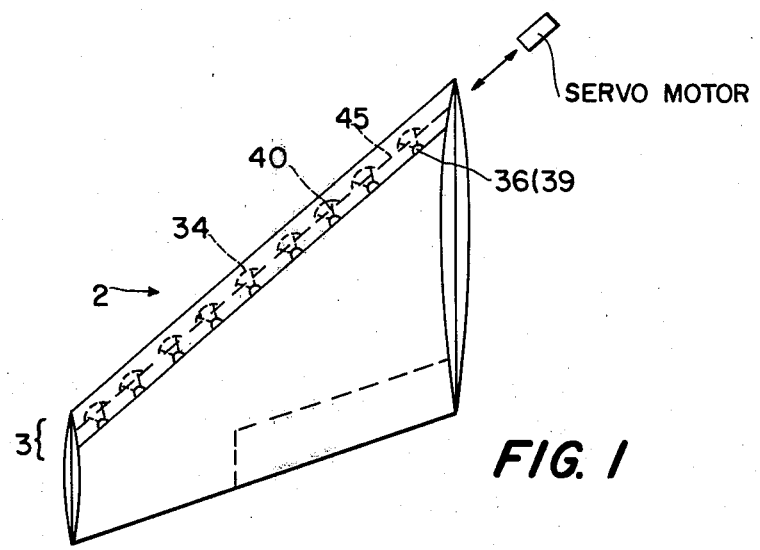
Figure 4:
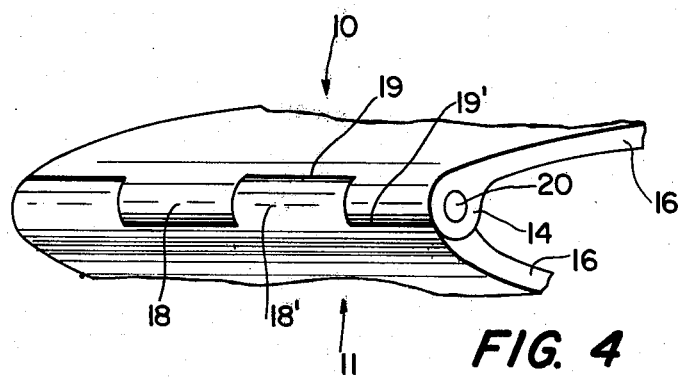
FIG. 4 illustrates a section of the forward wing part in a perspective view thereof.

Shown in FIG. 1 is one half of a swept-back airplane wing assembly and it is identified herein as a whole with reference numeral 2. Reference numeral 3 designates the forward wing part with the wing nose.

As is apparent in detail for the embodiment shown in FIGS. 2 through 8, the forward wing part 3 is composed of the forward or front wing spar 5 and the flexible coverings or skins 6 and 7 forming the upper wing side and the wing underside. The coverings are rigidly clamped in on one side at the forward wing spar 5. For the formation of the wing nose or leading edge, link band-shaped structural elements 10, 11 and 12 are provided, which each consist of the link band segments 14 with link or hinge bores, and of the wall portions 16 adjoining these segments 14. The link bands 10, 11 and 12 have, according to FIG. 4, the rebounds 19, 19' in the area of the bearing segments 14. In these rebounds 19, 19' engage in a hinge-like manner the parts 18, 18'—having been left between the rebounds—of the bearing segments 14. The mutually engaging or intermeshing link bands are pivotal about the joint pivot axes 20. The link band parts consist herein of extruded pieces. The surfaces 21 of the bearing segments 14 and the surfaces 22 of the band segments 16 of the link band parts 10, 11 and 12 constantly pass over into each other and form a part of the wing surfaces positioned in the flow. The wing parts may be assembled and disassembled in a simple manner. In the embodiment shown, three link bands, namely 10, 11 and 12, are provided adjacent each other in the manner of a link chain for the formation of the forward profile part 3, whereby the two ends of the link chain, i.e. the link bands 10 and 12, are rigidly connected to the upper and the lower flexible covering 6 and 7. The transition from the surfaces 21 and 22 of the link band parts 10 and 12 into the surfaces 23 and 24 of the upper and lower coverings 6 and 7 is provided so as to be without gap.

Independently of the embodiment shown, it is readily possible to provide for a larger number of link band parts than shown herein for the formation of the wing profile with band segments being dimensioned shorter in the direction of the profile depth. It is conceivable, for example, to provide, for the predominant portion of the wing, link band parts which hingedly adjoin each other. In that case supporting elements must engage in the links or hinges in known manner, and these supporting elements are forcibly guided for the change of the profile form or shape.

Figure 5:
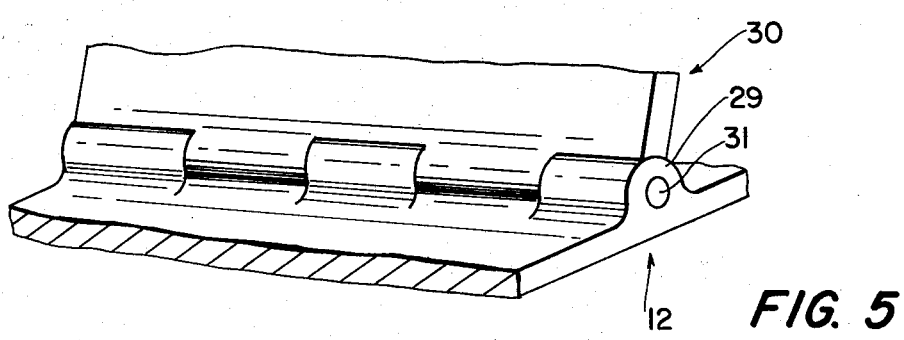
FIG. 5 illustrates another section of the forward wing part in a perspective view thereof.
Figure 6:
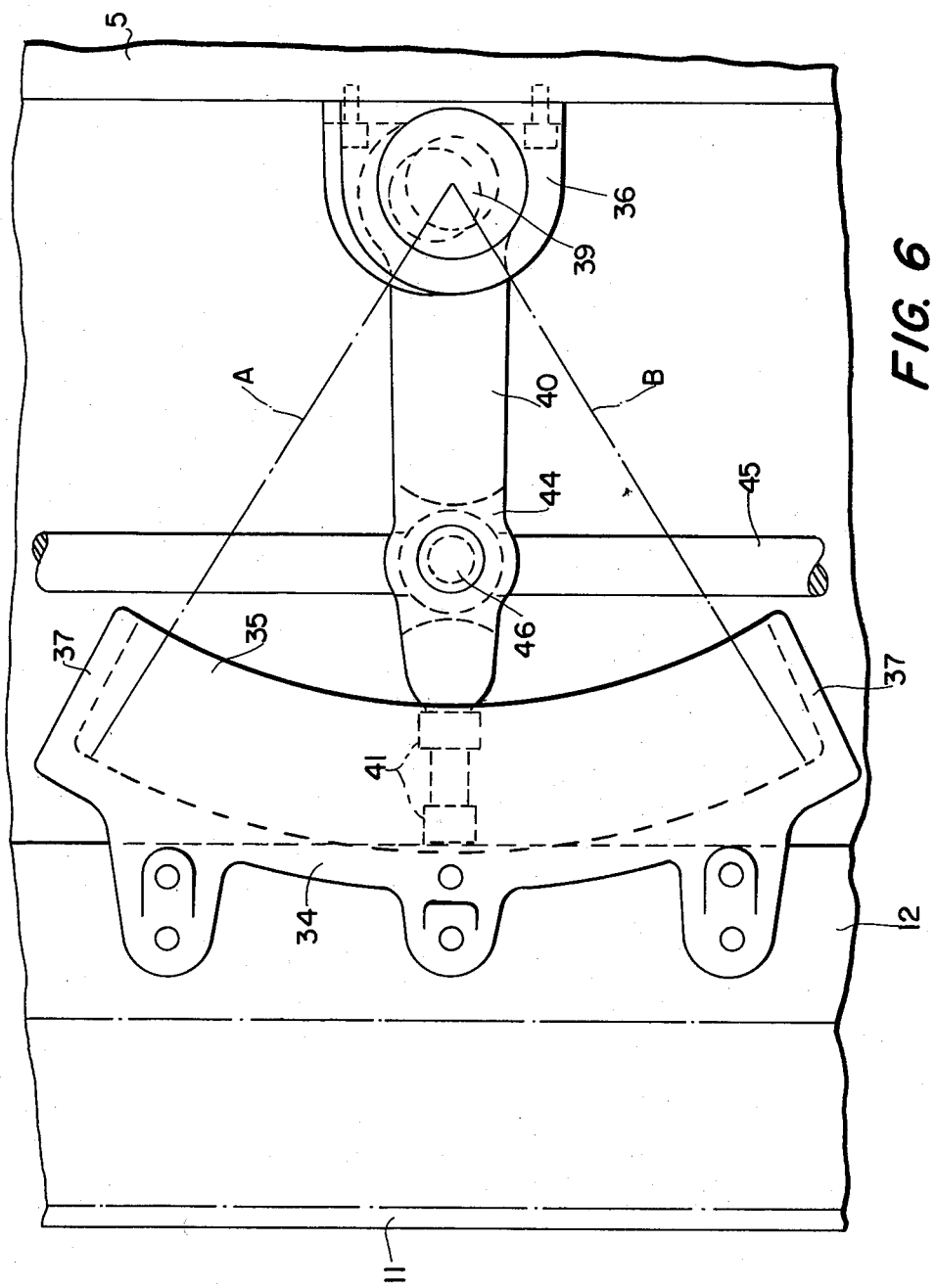
FIG. 6 illustrates, in a section from the forward wing part and in a top plan view of the wing underside, parts of the control gear.

Provided for the displacement of the link band parts is a displacing or adjusting device which is positioned within the space formed by the link band parts 10, 11 and 12 and the flexible coverings 6 and 7. For this purpose there are disposed at the link band parts 10 and 12 the bearing projections 28 and 29 into which the toggle joints 30 engage by way of the pivot axes 31. In this case, a plurality of such toggle joints are positioned so as to be distributed over the wing span. The toggle joint 30 is connected with the link band parts 10, 12 by way of multiple part links or hinges, as shown in FIG. 5. The link band parts 10, 11 and 12 form jointly with the toggle joints 30 a fourbar chain. Rigidly disposed at the inside of the link band part 10 and equally provided so as to be distributed over the span of the wing 2 are a plurality of displacing or adjusting coulisses 34 which have circular guide grooves 35 and are laterally closed off by the vertical walls 37 (FIG. 6). The guide grooves 35 are positioned in planes parallel to the reference wing plane E—E, and are positioned in a joint parallel plane, and serve for the engagement of the adjusting levers 40 (FIG. 6). These adjusting levers 40 come to be positioned by way of the bearing bores at the pivot axes 39, whereby the latter are held at the bearing projections 36 at the forward or front wing spar 5. The pivot axes 39 are provided so as to be inclined with respect to the reference plane E—E of the wing, so that the adjusting lever 40 during its pivoting movement with respect to the reference plane E—E executes a vertical movement on a circular path.

The adjusting levers 40 have the perforations 44 for the passage of a switching rod 45 which hingedly engages into the adjusting levers 40 by means of the journals 46. The switching rod 45 is adjacent a servo-motor indicated in FIG. 1. The adjusting levers 40 are provided, at the end thereof engaging in the guide groove 35, with the guide rollers 41. The maximum deflecting positions of the adjusting levers 40 are identified herein with the reference symbols A and B and are apparent from FIG. 6. The deflecting position A corresponds herein to the profile form or shape shown in FIG. 2 for high-speed flight, while the deflecting position B according to FIG. 3 indicates the profile form or shape for slow flight and for take-off and landing.

The operation of the construction described herein is as follows:

The wing nose or leading edge 4 may be changed between the two extreme positions according to FIGS. 2 and 7 and FIGS. 3 and 8 in the profile form thereof. The displacement or adjustment takes place in this case by means of the actuation of the switching rod 45 by means of which the adjusting levers 40 are pivoted in the same direction about their bearing pins or bolts 39. By way of the engagement of the adjusting levers 40 in the guide grooves 35 of the adjusting or displacing coulisses 34, and due to the inclined bearing axes 39, the adjusting levers 40 jointly with the flexible covering 6 and together with the link band part 10 being provided rigidly thereon, are pressed downwardly, for example from a position according to FIG. 2 into a position according to FIG. 3. This movement is effected by the four-bar chain formed by the link band parts 10, 11 and 12 as well as the toggle joints 30 by raising the levers 30 and the link band part 11 from the inclined position shown in FIG. 2. The result thereof is—as illustrated in FIG. 3—a profile form of the forward wing part 3 which is changed as compared to FIG. 2, and precisely in the sense that the profile curvature and the profile thickness as well as the nose radius are forcibly changed or altered. With the aid of the control gear 45, 40 and the displacing or adjusting coulisses 34 in combination with the four-bar chain, formed by the link band parts 10, 11, and 12 as well as the toggle joints 30, a changed or altered profile form or shape—corresponding to the degree of the adjustment or displacement—may be forcibly set, and a rigid wing bracing is formed in every position.

It will be obvious to those skilled in the art that many modifications may be made within the scope of the present invention without departing from the spirit thereof, and the invention includes all such modifications.

What is claimed is:

1. In a transverse driving body, particularly an airplane wing having a variable profile form and a displacing mechanism, the improvement comprising a plurality of link band means forming the front wing part, each of said link band means including bearing segment means and link band segment means, said link band means including at least three link band parts which are portions of the upper wing profile, lower wing profile and wing nose, said segments of said link band means having different curvatures with said bearing segment having a smaller radius of curvature than said band segment, and means adapted to act in conjunction with said displacing mechanism whereby said link band means can be selectively adjusted into different positions with respect to incident flow to provide at least one position where said wing has a low profile and small camber and at least one displaced position where said wing profile is increased and said wing camber is increased;

said bearing segment of said upper wing profile forming the leading edge in said one position and said band segment of said wing nose forming the leading edge in said displaced position.

2. A transverse driving body according to claim 1 in which link band means forming the end of a said link chain at the wing upper profile and wing lower profile adjoin flexible wing coverings, and including means clamping said flexible coverings at stationary wing parts.

3. A transverse driving body according to claim 1 including rocking lever means connecting said link band means of the upper wing profile and the lower wing profile.

4. A transverse driving body according to claim 3 in which said link band means and said rocking lever means form a four-bar chain.

5. A transverse driving body according to claim 1 including control means supported on stationary wing parts within the contour of the wing and engaging displacing means for said link band means, whereby the wing profile can be changed at a right angle to a horizontal reference plane of the wing.

6. A transverse driving body according to claim 5 including coulisse means secured to the interior of the upper side of said link band means, said coulisse means having guide groove means therein in the horizontal reference plane of the wing, and adjusting lever means engaged in said groove means and adapted to execute movements in the vertical direction by pivoting about axes inclined with respect to said horizontal reference plane.

7. A transverse driving body according to claim 6 including switching rod means extending in the direction of the wing span and connecting said adjusting lever means.

8. A transverse driving body according to claim 5 in which said control means includes pivot arm means having pivot axes inclined with respect to said horizontal reference plane of the wing.

* * * * *

UNITED STATES PATENT AND TRADEMARK OFFICE
CERTIFICATE OF CORRECTION

PATENT NO. : 4,281,812

DATED : August 4, 1981

INVENTOR(S) : Herbert Zimmer

It is certified that error appears in the above—identified patent and that said Letters Patent is hereby corrected as shown below:

ON THE TITLE PAGE:

Item [30] has been omitted and should read as follows:

Foreign Application Priority Data
October 12, 1978 (DE) Fed. Rep. of Germany . . . 2844476

Lines 4, 6, and 7, of the Abstract, "bends", each occurrence, should read - - - bands - - -.

Column 6, line 2 of Claim 2, after "which", insert - - - said - - -; same line, delete "a".

Signed and Sealed this

Twenty-fourth Day of November 1981

[SEAL]

Attest:

Attesting Officer

GERALD J. MOSSINGHOFF

Commissioner of Patents and Trademarks